(12) United States Patent
Liu et al.

(10) Patent No.: US 9,710,391 B2
(45) Date of Patent: Jul. 18, 2017

(54) METHODS AND APPARATUSES FOR EFFICIENT LOAD PROCESSING USING BUFFERS

(71) Applicant: Intel Corporation, Santa Clara, CA (US)

(72) Inventors: Wei Liu, San Jose, CA (US); Youfeng Wu, Palo Alto, CA (US); Christopher Wilkerson, Portland, OR (US); Herbert Hum, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 480 days.

(21) Appl. No.: 13/886,467

(22) Filed: May 3, 2013

(65) Prior Publication Data

US 2013/0246712 A1 Sep. 19, 2013

Related U.S. Application Data

(62) Division of application No. 12/640,707, filed on Dec. 17, 2009, now Pat. No. 8,452,946.

(51) Int. Cl.
*G06F 15/00* (2006.01)
*G06F 12/0888* (2016.01)
*G06F 9/45* (2006.01)
*G06F 9/30* (2006.01)
*G06F 9/38* (2006.01)

(52) U.S. Cl.
CPC ........ *G06F 12/0888* (2013.01); *G06F 8/4442* (2013.01); *G06F 9/30043* (2013.01); *G06F 9/383* (2013.01); *G06F 9/3826* (2013.01); *Y02B 60/1225* (2013.01)

(58) Field of Classification Search
None
See application file for complete search history.

(56) References Cited

U.S. PATENT DOCUMENTS

| 7,010,648 | B2 | 3/2006 | Kadambi et al. |
| 7,093,106 | B2 | 8/2006 | Ambekar |
| 7,290,116 | B1 | 10/2007 | Grohoski |
| 7,519,796 | B1 | 4/2009 | Golla |

(Continued)

FOREIGN PATENT DOCUMENTS

| JP | H4-123241 | 4/1992 |
| JP | 2001-290702 | 10/2001 |

(Continued)

OTHER PUBLICATIONS

Yang et al.; Energy-Efficient Load and Store Reuse; 2001.*
Japanese Patent and Trademark Office, Office Action mailed Oct. 9, 2012 in Japanese application No. 2010-248263.
European Patent Office, Office Action mailed Jun. 6, 2011 in European application No. 10 252 004.6-2211.

(Continued)

*Primary Examiner* — Corey S Faherty
(74) *Attorney, Agent, or Firm* — Trop, Pruner & Hu, P.C.

(57) ABSTRACT

Various embodiments of the invention concern methods and apparatuses for power and time efficient load handling. A compiler may identify producer loads, consumer reuse loads, consumer forwarded loads, and producer/consumer hybrid loads. Based on this identification, performance of the load may be efficiently directed to a load value buffer, store buffer, data cache, or elsewhere. Consequently, accesses to cache are reduced, through direct loading from load value buffers and store buffers, thereby efficiently processing the loads.

15 Claims, 7 Drawing Sheets

(56) References Cited

U.S. PATENT DOCUMENTS

| | | |
|---|---|---|
| 2002/0066090 A1 | 5/2002 | Babaian et al. |
| 2004/0073906 A1 | 4/2004 | Chamdani et al. |
| 2005/0055533 A1 | 3/2005 | Kadambi et al. |
| 2005/0188184 A1 | 8/2005 | Senter et al. |

FOREIGN PATENT DOCUMENTS

| | | |
|---|---|---|
| JP | 2008-90411 | 4/2008 |
| JP | H8-161226 | 7/2008 |

OTHER PUBLICATIONS

European Patent Office, European Search Report dated Mar. 17, 2011 in European application No. 10252004.6-2211.
U.S. Appl. No. 11/967,230, filed Dec. 30, 2007, entitled "Compiler Assisted Lower Power And High Performance Load Handling," by Tingting Sha, et al.
Il Park, et al, "Reducing Design Complexity of the Load/Store Queue," In Proceedings of the 36th Annual IEEE/ACM International Symposium on Microarchitecture, Dec. 3-5, 2003, pp. 1-12.
Lee Baugh, et al., "Decomposing the Load-Store Queue By Function for Power Reduction and Scalability," Mar. 2006, pp. 1-11.
Miquel Pericas, et al., "A Two-Level Load/Store Queue Based on Execution Locality," Jun. 2008, pp. 1-12.
F. Castro, et al., "LSQ: A Power Efficient and Scalable Implementation," Nov. 2006, pp. 1-10.
European Patent Office, European Examination Report mailed Mar. 17, 2014 for European Application No. 10252004.6.

* cited by examiner

```
Collect_Phase_I {
    for each memory access m {
        if (isLoad m) {   // load
            count_all_loads++;
            if (isHitSFB m) {
                count_F_loads++;
            }
            If (isHitLVB m) {
                count_C_loads++;
            } else if (m has more uses in look ahead windows
                       than the to-be-replace load from LVB) {
                count_P_loads++;
                insert m into LVB;
            }
        } else {   //store
            insert m into SFB;
            invalidate m in LVB if m presents;
        }
    }
}

(a) Collection Stage in Phase I: collecting F/P/C counters

Classify_A_Load_Phase_I (p, c, f) {   //p, c, f are probability of being P/C/F load
    if ( f > FLoadThreshold) return FLoad;
    if ( (p+c) > PLoadThreshold && p > 0.0) return PLoad;
}

(b) Classification Stage in Phase I: only mark F and P loads
```

FIG. 4A

```
Collect_Phase_II {
  read in the F/P loads decision made in Phase I;
  for each memory access m {
    if (isLoad m) {    // load
      count_all_loads++;
      if (isMarkedAsFLoad (m)) {
        count_F_loads++;              // preserve the Phase I decision of F loads
      } else if (isHitLVB (m)) {
        count_C_loads++;
      } else if (isMarkedAsPLoad (m)) {
        count_P_loads++;              // preserve the Phase I decision of P Loads
        insert m into LVB;
    } else {    //store
      insert m into SFB;
      invalidate m in LVB if m presents;
    }
  }
}
```

(a) Collection Stage in Phase II: collecting F/P/C counters

```
Classify_A_Load_Phase_II (p, c, f) {   //p, c, f are probability of being P/C/F load
  if (f > FLoadThreshold) return FLoad;
  if (p > PLoadThreshold) return PLoad;
  if ((p+c) > QThreshold && p > 0.0) return QLoad;
  if (c > CLoadThreshold) return CLoad;
}
```

(b) Classification Stage in Phase II: mark F/P/C/Q loads

FIG. 4B

METHODS AND APPARATUSES FOR EFFICIENT LOAD PROCESSING USING BUFFERS

This application is a divisional of U.S. patent application Ser. No. 12/640,707, filed Dec. 17, 2009, the content of which is hereby incorporated by reference.

BACKGROUND

A load operation may include any instruction, operation, or micro-operation to load a value from a memory, such as a cache or other memory device. In some processors a load may search a store buffer (SB) and first level data cache simultaneously in an attempt to access data in a timely manner. However, if the load hits the SB (e.g., load can be satisfied by data in the SB that has yet to be written back to a cache) the cache access was unnecessary and the power consumed in accessing the cache was wasted.

Several techniques may be used to avoid such power waste while still providing timely access to data. First, processors may serialize accesses by first searching the SB and then the data cache. However, doing so may hurt time performance if there is a SB miss. Second, the number of cache accesses may be reduced, thereby conserving power, by using hardware predictors to identify loads that do not require cache access. However, using hardware predictors may result in increased power consumption.

BRIEF DESCRIPTION OF THE DRAWINGS

Features and advantages of embodiments of the present invention will become apparent from the appended claims, the following detailed description of one or more example embodiments, and the corresponding figures, in which:

FIGS. 4A and B illustrate embodiments of pseudo code for methods of efficiently handling load operations.

DETAILED DESCRIPTION

In the following description, numerous specific details are set forth such as examples of specific processor architecture, pre-fix values, types of loads, sizes of data blocks and corresponding buffers, identification techniques for compilers of different load types, and the like to provide a thorough understanding of embodiments of the present invention. However, these specific details need not be employed to practice embodiments of the invention. Components or methods concerning, for example, compiler composition, specific compilation techniques, specific logic implementation, and other specific operation details have not been described in detail in order to avoid unnecessarily obscuring the embodiments of the present invention. References to "one embodiment", "an embodiment", "example embodiment", "various embodiments", and the like indicate that the embodiment(s) of the invention may include particular features, structures, or characteristics, but not every embodiment necessarily includes the particular features, structures, or characteristics. Further, some embodiments may have some, all, or none of the features described for other embodiments. Also, unless otherwise specified, using "first", "second", "third", and the like to describe a common object merely indicates different instances of like objects are being referred to, and are not intended to imply that the objects so described must be in a given sequence, either temporally, spatially, in ranking, or in any other manner. In addition, the term "coupled" may mean that two or more elements co-operate or interact with each other, but they may or may not be in direct physical or electrical contact.

Various embodiments of the invention concern methods and apparatuses for power and time efficient load handling. In one embodiment of the invention, a compiler or other code may identify producer loads, consumer reuse loads, consumer forwarded loads, and producer/consumer hybrid loads. Based on this identification, performance of the load may be efficiently directed to a load value buffer (LVB), SB (also known as store forward buffer SFB), data cache, or elsewhere. Consequently, accesses to cache are reduced, through direct loading from or to LVBs and SBs, without sacrificing load performance.

Figure 1:
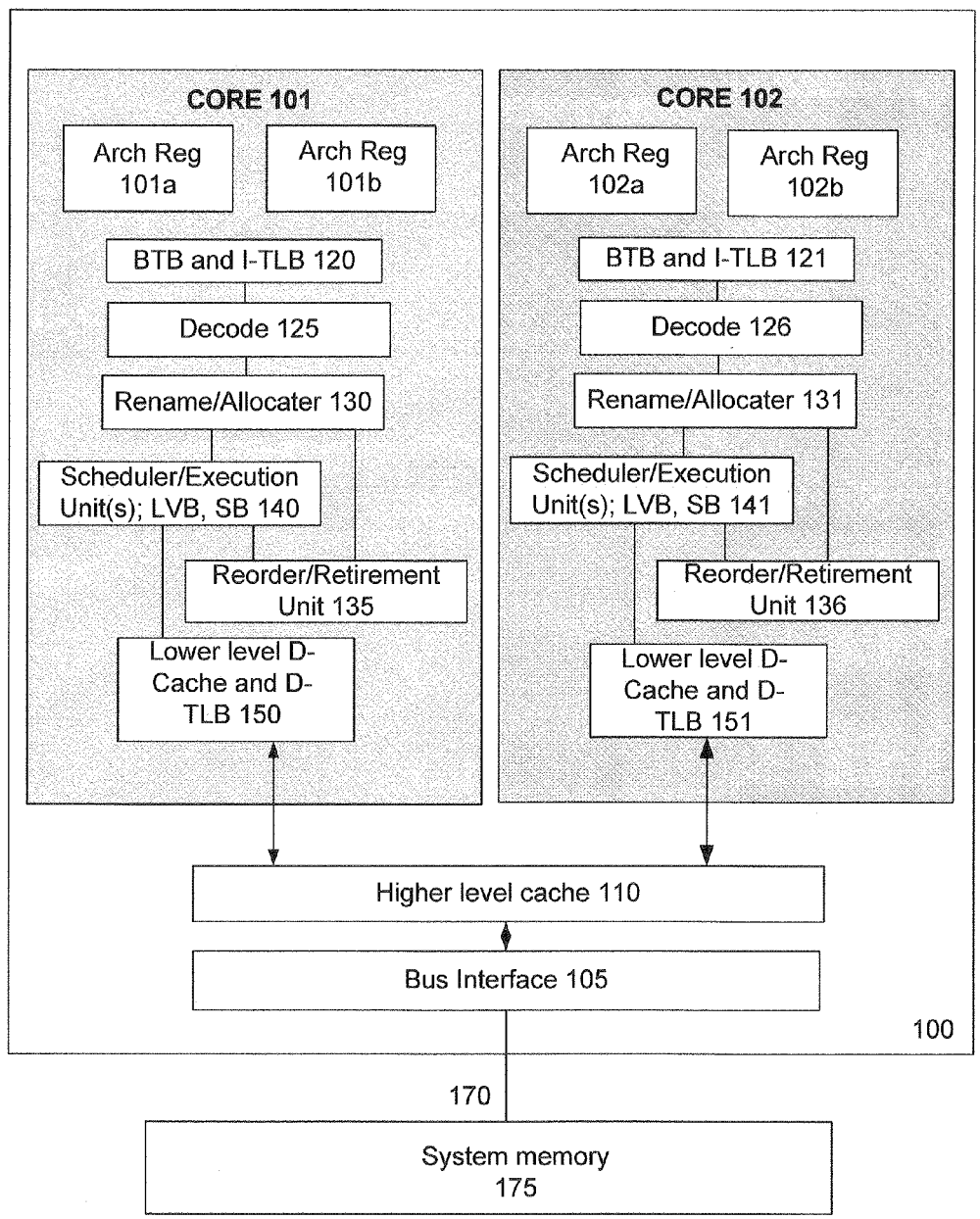
FIG. 1 illustrates a processor in an embodiment of the invention.

FIG. 1 depicts an embodiment of a multi-processing element processor 100 capable of power and time efficient load handling. A processing element refers to a thread, process, context, logical processor, hardware thread, core, and/or any processing element that utilizes processor resources such as reservation units, execution units, pipelines, and/or higher level caches/memory. A processor may include an integrated circuit (IC) that has other processing elements such as cores or hardware threads. A core may have logic located on an IC capable of maintaining an independent architectural state where each independently maintained architectural state is associated with some dedicated execution resources. In contrast, a hardware thread may have logic located on an IC capable of maintaining an independent architectural state where the independently maintained architectural states share access to execution resources. Processor 100 may include a speculative out-of-order microprocessor architecture, but embodiments of the invention are not so limited and may be implemented with any processor system, such as an in-order processor system.

Processor 100 includes cores 101, 102, which share access to higher level cache 110. Core 101 includes hardware threads 101a, 101b and core 102 includes hardware threads 102a, 102b. Software entities (e.g., operating system) may view processor 100 as four separate processors capable of executing four software threads. The four threads may respectively be associated with architecture state registers 101a, 101b, 102a, and 102b. Processor 100 may include asymmetric cores (i.e., cores with different configurations, functional units, and/or logic) or the illustrated symmetric cores. Consequently, core 102, illustrated as identical to core 101, is not discussed in detail.

Architecture state registers 101a are replicated in architecture state registers 101b so individual architecture states/contexts are capable of being stored for logical processor 101a and logical processor 101b. Other smaller resources, such as instruction pointers and renaming logic in rename allocator logic 130, may also be replicated for threads 101a and 101b. Some resources, such as re-order buffers in reorder/retirement unit 135, I-TLB 120, load storage buffers, SBs, and queues may be shared through partitioning. Other resources, such as general purpose internal registers, page-table base register, low-level data-cache and data-translation buffer (TLB) 150, execution unit(s) 140, and portions of out-of-order unit 135 may also be shared.

Bus interface module 105 may communicate with devices external to processor 100, such as system memory 175, a chipset, Northbridge, or other IC. Memory 175 may be dedicated to processor 100 or shared with other devices in a system. Higher-level cache 110 may cache recently fetched and/or operated on elements. "Higher-level" refers to cache levels further way from the execution unit(s). Higher-level cache 110 may be a second-level data cache but cache 110 is not so limited and may be included in, for example, an instruction or trace cache. A trace cache may be coupled after decoder 125 to store recently decoded traces.

Module 120 may include a branch target buffer to predict branches to be executed/taken and an instruction-translation buffer (I-TLB) to store address translation entries for instructions. Processor 100 may be capable of speculative execution and be able to prefetch and speculatively execute predicted branches.

In one embodiment of the invention, machine code instructions that access memory, such as load operations, may include a load identifier (ID) or indicator field to identify the related load type. Code, such as a compiler, may determine a type of load operation and include a value in the load ID field to indicate the load type. Load types a compiler or other code may identify may include a producer load (P load), a forwarded consumer load (F load), a reuse consumer load (C load), a producer/consumer hybrid load (Q load), and a normal load (N load). Decode module 125, coupled to unit 120, may decode "fetched elements" from unit 120 and the load ID field to identify the type of load operation. This process will be described in greater detail with regard to FIG. 2.

Allocator and renamer block 130 may include an allocator to reserve resources (e.g., register files) to store instruction processing results. However, threads 101*a* and 101*b* are potentially capable of out-of-order execution, where allocator and renamer block 130 also reserves other resources, such as reorder buffers to track instruction results. Unit 130 may include a register renamer to rename program/instruction reference registers to other registers internal to processor 100. Reorder/retirement unit 135 may include components (e.g., reorder buffers, load buffers, and SBs) to support out-of-order execution and later in-order retirement of instructions executed out-of-order.

Scheduler and execution unit(s) block 140 may include a scheduler unit to schedule instructions/operations on execution units. Instructions/operations may potentially be scheduled on execution units according to their type availability. Register files associated with the execution units may be included to store information instruction processing results. Exemplary execution units may include a floating point execution unit, an integer execution unit, a jump execution unit, a load execution unit, a store execution unit, and other execution units. As will be described in greater detail with regard to FIG. 2, block 140 may also include SB and LVB but those buffers may be located elsewhere in various embodiments of the invention.

Lower level data cache and data translation buffer (D-TLB) 150 may couple to execution unit(s) 140. The data cache may store recently used/operated on elements (e.g., data operands) that are held in memory coherency states, such as modified, exclusive, shared, and invalid (MESI) states. The D-TLB may store recent virtual/linear to physical address translations. A processor may include a page table structure to break physical memory into a plurality of virtual pages.

Figure 2:
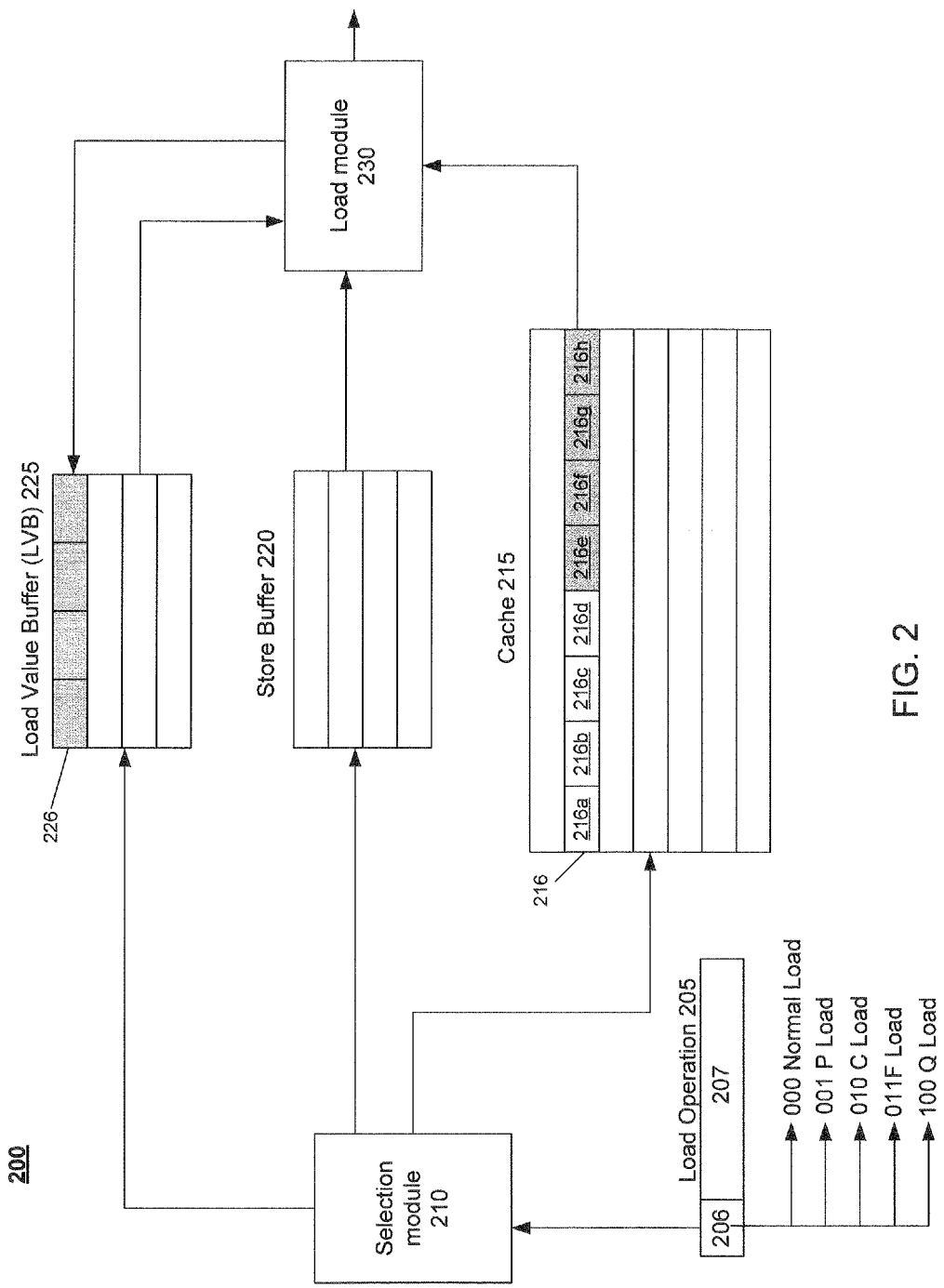
FIG. 2 illustrates an embodiment including logic and memory to provide power and time efficient handling of load operations.

FIG. 2 depicts an embodiment of the invention for identifying different load types to conserve power while maintaining performance during load processing. For example, during compilation compilers (and similar code as embodiments of the invention are not limited to use with compilers) may optimize code, re-arrange code/slices, and insert operations/instructions to take advantage of specific hardware supported features. Any method of a compiler or similar code that analyzes other code, determines control flows, dependencies, or inserts additional software constructs, such as operations, functions, function calls, and other executable constructs may be utilized to determine and identify loads as described below. Furthermore, although a compiler is discussed for exemplary purposes to illustrate identification of load types, other code (e.g., interpreter, parser, interpreter, binary translator, and the like) may be utilized to process loads as described below.

P, C, F, Q, and N Loads

In one embodiment, loads are classified into P, C, F, Q, and/or N loads. Again, a load operation may include any instruction, operation, or micro-operation to load a value from a memory, such as a cache or other memory device. A load operation may be part of a larger instruction. Instruction sets may include instructions that are decoded into multiple micro-operations. A single micro-operation may be a load operation where the loaded value is further processed as guided by other instruction related micro-operations.

Consumer loads potentially utilize values of previous store operations and/or load operations. Consumer loads may be differentiated into consumer reuse loads (C loads) and consumer forwarded loads (F loads), which respectively correspond to a load that loads from a previous load and a load that loads from a previous in-flight store.

A C load may include a load operation that is to load a data block that is the same data block included in, or the subject of, a previous load, such as a producer load (P load). A C load may also include a load from a data block loaded by a previous load as well as a next data block which may have been pre-loaded by the previous load. For example, a previous load may perform a load of a referenced data block A and load three additional data blocks B, C, D. So the referenced data blocks of the previous load include A, B, C, D. The C load can be a subsequent load that loads block A and/or one of blocks B, C, D. The P load includes the previous load that performs a load of A, B, C and D.

An F load may be similar to a C load except the F load is to load a data block to be written by a previous in-flight store operation instead of, for example, data predictively loaded by a P load. For example, a store operation may be in-flight in a SB with a new data block for a location, which is the most recent value (i.e., valid and correct value) to be loaded. As a result, when a load operation is to load from an in-flight store that load operation is often referred to as a consumer forwarded load (F load).

A Q load may include a form of P/C hybrid load. In other words, in an embodiment Q loads include P and C loads. For example, a load inside a loop may be a Q load. Depending on the point of execution of the loop, a load may satisfy definitions for both P and C loads.

Identifying P, C, F, Q, and N Loads

In one embodiment, a P and C load pair may be determined from both a P load and any number of C loads referencing the same address (i.e., the C and P loads intend to load the same data block). P and C load pairs may also be identified through proximity of load addresses. For example, a subsequent load may be determined to be a C load of a previous load if a data block to be loaded by the subsequent load is within a certain proximity of a data block to be loaded by the previous load.

Again referring to FIG. 2, in an embodiment cache 215 may include 64 byte cache lines, which each hold data in 8 readable data blocks (e.g., entries 216a-216h) of 8 bytes each. Load value buffer (LVB) 225 may include 32 byte lines (e.g., entry 226), which each hold data in 4 blocks of 8 bytes each. As a result, when loading from cache line 216 up to 32 bytes may be held in entry 226 of LVB 225. If a first load operation references data block 216e, then any of the three data blocks next to 216e (e.g., 216f-h or 216b-d) may also be loaded and placed in load entry 226 (32 bytes). As illustrated, shaded data blocks 216e-h are predictively loaded in performance of the first load operation of 216e. As a consequence, any subsequent load that is to load from data blocks 216e-h, which may be held in LVB 225, may be identified as a C load to be paired with the first load as a P load. LVB 225 may be organized in a FIFO format.

In the example above, predictive loading is discussed in reference to loading a data block and then contiguous data blocks in one direction. However, data blocks may be loaded in any direction such as a number of blocks before the block to be loaded 216e (e.g., 216b-216e) or a number of blocks on either side of the block to be loaded 216e (e.g., 216c-f). A direction may be predefined. The referenced block and the subsequent next number of blocks may be loaded, or in the alternative, the direction may be inserted by the compiler to be recognized by hardware.

In one embodiment, P and C load pairs may be identified using other criteria than that addressed above. For instance, a number of intervening load operations, inclusion within a same code segment, and/or a number of load value buffer entries may be criteria. Regarding using a number of intervening load operations to identify P and C load pairs, LVB 225 may include 16 entries. As a result, a maximum of sixteen load entries may be filled in buffer 225 before some entries are evicted or overwritten. So if there are sixteen identified P loads between a first P load and a subsequent load that references the same data block as the first P load, then the subsequent load is not identified as a C load to be paired with the first P load since the data associated with the P load may no longer reside in buffer 225. Thus, in some embodiments of the invention a load can be preliminarily identified as a P load even though the load may have no corresponding C load because, for example, the P load is ejected from LVB before a subsequent load loads from the LVB.

In one embodiment, a compiler may determine an F load and store pair. A subsequent load that loads from an address to be written to by a previous store operation may be identified as an F load. When an F load operation is to load from an in-flight store, the addresses of the store and load may be referred to as collision addresses. A compiler may use additional criteria to identify F loads such as, for example, matching address pair of a store and a load, size of the store, size of the load, whether the store and load are in the same code slice, and the number of intervening stores between the target store and load.

In one embodiment, a Q load may be determined as a load which satisfies the criteria for both P and C loads. For example, a Q load includes a load that reads certain data blocks that, at a later time, are referred to by the same load again. Q load identification is discussed further below. Regarding N loads, in one embodiment, failure to identify a load as a P, C, F, or Q load results in the compiler identifying a load as an N load to be performed from cache 215 as normal.

FIGS. 4A and 4B include pseudo-code utilizing a multi-phase technique for identifying P, C, F, Q, and N loads in one embodiment of the invention. While embodiments of the invention may use differing numbers of phases to analyze loads, the embodiment in FIGS. 4A and B address a two-phase analysis method. FIG. 4A includes the first phase and FIG. 4B includes the second phase. Generally, during the first phase a compiler may model or emulate SB 220 and LVB 225 using, for example, abstracting techniques to determine data structures to represent the buffers. The compiler may use the emulation to estimate the probability of loads being an F, P, C, Q, or N load. More specifically, the compiler may emulate SB 220 and LVB 225 and loads present in the target code so the compiler can mark loads as F, P, C, and/or Q loads. In one embodiment the compiler marks F and P loads in the first phase and C and Q loads in the second phase. The marking may be divided into separate phases because, for example, C loads are dependent on P loads and thus, identifying C loads is easier after P loads are identified. In an embodiment using a dynamic binary translator, the first and second phases may run in a software pipeline fashion with the second phase using the outcome of the first phase dynamically.

Each phase may include a collection stage and a classification stage. Both FIGS. 4A and B include these two stages. FIG. 4A phase 1 includes Collect_Phase_I and Classify_A_Load_Phase_I (p, c, f). The collection stage collects or counts all loads (count_all_loads++) and counts F, C, and P loads (count_F_loads++, count_C_loads++, count_P_loads++) by, for example, checking memory addresses (e.g., is HitLVB m). Dividing F and P counts by the total load count allows the compiler to respectively calculate or estimate probability of a load being an F or P load. In an embodiment, the SB and LVB modeling only happens in the collecting stage. The classification stage decides whether to mark a load as an F or P load based on, for example, predetermined thresholds. In an embodiment if a load has an F load probability greater than the related predetermined threshold the load is marked as F load. In an embodiment, a P load may be preliminarily determined based on whether P load counts are greater than 0 and whether the sum of P and C counts exceed a predetermined threshold. Other embodiments are not limited to these particular methods.

FIG. 4B phase 2 includes Collect_Phase_II and Classify_A_Load_Phase_II (p, c, f). The collection stage may include the F and preliminary P results from the first phase (e.g., count_F_loads++, count_P_loads++) and then proceed to mark C and Q loads. C load counts may now be determined with greater accuracy than would have been the case had they been determined in the first phase (e.g., before or simultaneously with initial P load determination). For example, a P load may first be identified based on a preliminary estimation of whether the load is indeed a P load. Later, if a subsequent load has an LVB hit the subsequent load may be deemed a C load and the preliminary estimation regarding the presence of a P load may be confirmed. However, even though a P load was preliminarily identified, there may be a situation where the LVB contents are replaced/evicted before the subsequent load can access data blocks in the LVB associated with the P load. In this situation the load preliminarily designated a P load may now be considered an N load with no related C load. Thus, it is more accurate to preliminarily identify the P load in a first phase and identify C loads (and confirm the preliminary estimate regarding the P load) in a subsequent second phase. The same is true for Q loads that also rely on P load determination for proper Q load marking.

The classification stage of FIG. 4B decides whether to mark a load C or Q based on, for example, predetermined thresholds. In one embodiment, the corresponding threshold criteria for P loads changes from phase 1 (e.g., (p+c) >PLoadThreshold && p>0.0) to phase 2 (e.g., p>PLoadThreshold). In other words, in one embodiment of the invention a preliminary estimate or determination regarding the P load occurs in phase I and a refined estimate or determination regarding the P load occurs in phase II. This change in thresholds may be beneficial because the ability to identify a target load as a P load is more difficult in phase I than it is in phase II. This increased identification difficulty may exist because, for example, a target load in LVB may be used again (making target load a P load) or not (making target load something other than a P load). Thus, P loads are cautiously and preliminarily compared to a lower threshold in phase I than in phase II. For example, by using the (P+C) criteria in phase I the possibility of the load being either a P or Q load is considered by preliminarily designating the load as a P load. Thus, early in the analysis (phase I) the load is considered either a P or Q load, without great differentiation between the two types of loads. However, later in the analysis process (phase II) the final determination is made when Q and C loads are more readily identified. Thus, because the ability to identify C and Q loads increases in phase II the classification for P loads may be more stringent in phase II (as opposed to phase I) by comparing against a higher threshold. Q loads may also be determined based on loads that seem to satisfy the requirements for both C and P loads (e.g., (p+c)>QThreshold && p>0.0). In other embodiments of the invention, the criteria for P load determination does not necessarily change between analysis phases.

In one embodiment of the invention, a software structure such as a "look-ahead window" may be utilized. For example, for each load the profiler analyzes, if the profiler would like to determine if the target load can be preliminarily marked as P load, based on a first estimate of whether the load is a P load, the profiler may consult a "look-ahead window" to determine how many C loads, which correspond to the P load in question, exist. Then, based on this determination the profiler may determine whether marking the load as a P load would be beneficial in terms of efficiency. If the efficiency gains are not substantial (e.g., because of the low number of related C loads), the load may not be marked as a P load (i.e., confirmed as a P load) but instead left as an N load.

Compiler Optimization

Figure 5:
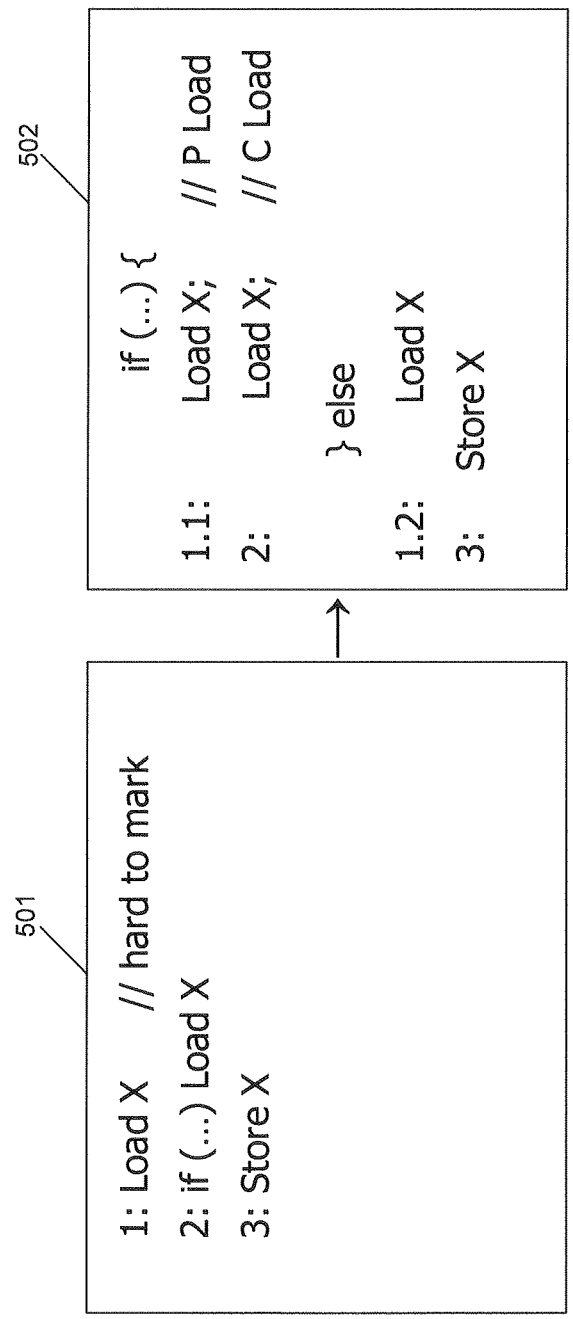
FIG. 5 illustrates an embodiment of pseudo code for a method of optimizing code to efficiently handle load operations.

FIG. 5 includes a method for compiler optimization to better mark loads in one embodiment of the invention. Area 501 includes original code and area 502 includes optimized code. Moving loads into predecessor or successor blocks may improve the bufferability of a single load because, for example, the load gets duplicated. For example, marking line 1 (1: Load X) as a C or P load is difficult because of the conditional nature of line 2 (2: if (. . . ) Load X). If load 1 (1: Load X) is marked as a P load it may not be used before it is invalidated in line 3 (3: Store X). However, if load 1 is not marked P then load 2 may lose the opportunity to be marked as a C load (e.g., because no P load has been determined). After code motion and duplication, however, load or line 1 may be duplicated (see area 502) into load 1.1 (1.1 : Load X) and 1.2 (1.2: Load X). The modified code then shows both branches from the conditional branch in the original code. The first branch shows repeating Load X commands (1.1 and 2) that indicate P and C loads are present. The other branch (1.2 and 3) indicates the single Load X has no follow up load (no C load) and is merely an N load.

Figure 6:
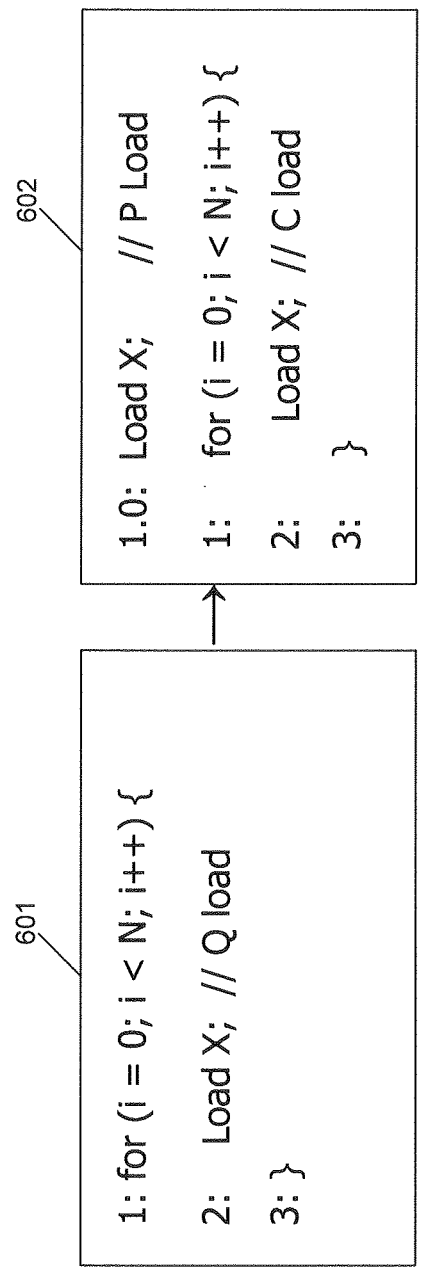
FIG. 6 illustrates an embodiment of pseudo code for a method of optimizing code to efficiently handle load operations.

FIG. 6 also includes a method for compiler optimization to better mark loads in one embodiment of the invention. Area 601 includes original code and area 602 includes optimized code. Loads inside a loop can be either P or C loads. Therefore, such loads may be marked as Q loads in one embodiment. However, in one embodiment Q loads may carry more overhead than P loads since Q loads may require that the LVB be searched first to see if the load exists in the LVB already. Instead, P loads can be dispatched to the DCU directly without consulting with the LVB. Thus, in one embodiment loop peeling may be used to differentiate or split one or more Q loads into P and C loads. Specifically, in the modified code (area 602) line 1.0 (1.0: Load X) has been peeled out of the loop for the following condition: i=0. The remaining loop then begins with, for example, i=1. However, due to the peeling out of line 1.0, there is now context to distinguish between the P load (line 1.0) and C load (line 2) and to label those loads accordingly.

Compilers may be further adjusted to modify identification results. For example, an aggressive compiler may identify a subsequent load, which loads from the same address as a previous store, as an F load. However, a more conservative compiler may identify an F load only if the load is the same size or bigger than a store that references the same address and there are no intervening store operations between the store and the load. Also, a certain number of stores may be included between the previous store and a consumer forwarded load. For instance, a range between 0 and a maximum number of SB entries may be allowed for the number of intervening stores based on the level of aggressiveness of the compiler. If the number of stores exceeds that range, a less aggressive compiler may not identify the target load as an F load.

In one embodiment, the number of factors utilized in determining consumer loads (e.g., how conservative a compiler is in identifying consumer loads) is based on a target percentage of correctly identified consumer loads. For example, if all subsequent loads with the same address as a previous store are identified as consumer loads, the store may be de-allocated from SB 220 when data needs to be loaded, which leads to a low identification accuracy. Too low an identification accuracy may potentially lead to a large number of replays, which costs execution cycles. In the alternative, too many constraints potentially lead to very accurate identification, but mitigate the potential positive impact (e.g., power savings) of not identifying true consumer loads. As a purely illustrative example, a range of 80% to 100% for identification accuracy may be targeted to ensure more positive execution cycles are saved by not accessing cache 215 then the number of execution cycles cost replaying misidentified loads.

Handling Identified P, C, F, Q, and N Loads

Returning to FIG. 2, the following more fully addresses an embodiment for handling different loads. Portion 206 (load type field) of load operation 205 identifies a type of load operation 205. Portion 206 may be located anywhere in load operation 205 or associated in any manner with load operation 205. In one embodiment, portion 206 includes or is included within a pre-fix byte of load operation 205. Other information, such as an opcode and referenced address, may be included in another portion 207 of load operation 205.

Three bits of portion 206 may be utilized to represent a type of load operation 205. Binary values may represent load operation 205 is an N load (000), P load (001), C load (010), F load (011), or Q load (100). N loads may not necessarily be marked.

Selection module 210 may direct performance of the load to the correct memory structure (e.g., cache 215, SB 220, LVB 225). Selection module 210 may receive load operation 205, or at least portion 206, to determine which of the memory structures may perform the load operation. Decode logic (Decode 125 in FIG. 1), which may be the same as decode logic to decode instructions or separate decode logic, may decode portion 206. Decode logic may assess bits of portion 206 and provide them to selection logic (e.g., multiplexer) that directs performance of the load to the correct memory structure. Directing performance of a load may include forwarding the load to one of the structures. Selection logic may provide a selection signal to a module, such as load module 230, to indicate which structure is to be loaded from. Selection module 210, in combination with load module 230, may include any logic to select a memory structure to load to and/or from. In one embodiment of the invention, LVB 225, SB 220, selection module 210, and load module 230 may be included in modules 140, 141 (FIG. 1) while cache 215 may be located in cache 150, 151 (FIG. 1). However, these components need not be so constrained and may be located elsewhere.

As an illustrative example of the above, portion 206 may include a pre-fix value 010 to indicate load operation 205 is a C load. Decode logic may mask off those bits and selection logic may determine LVB 225 may be loaded from based on the logic's determination. Load module 230 may search LVB 225 based on an address value associated with load operation 205, such as a tag value. When the correct entry is found (e.g., entry 226) it may be provided to the correct destination (e.g., internal processor register).

In one embodiment, in response to portion 206 holding a P load value, a load from cache 215 is performed. Cache 215 may include any cache (e.g., instruction cache, trace cache, data cache, as well as any level of cache). A data block for the P load (e.g., referenced data block) may be loaded from cache 215 and a plurality of additional data blocks may also be loaded. As an example, a default or predefined number of data blocks, associated with the entry size a LVB 225 is capable of holding, is loaded from cache 215. In another embodiment, load operation 205 includes a field to indicate how many data blocks are to be loaded, what direction they are to be loaded in, and the like. The loaded value will be stored in LVB in addition to the correct destination.

Returning to the example where portion 206 holds a C load value, a load from LVB 225 may be performed without accessing cache 215. As an example, LVB 225 includes a plurality of entries with previously loaded data from P or Q loads. In one embodiment, LVB 225 is part of an existing load buffer that tracks current loads. In the alternative, LVB 225 is a separate buffer structure. LVB 225 may include entries (e.g., entry 226) that have an associated P load value in a tag field. Therefore, when a load is performed from LVB 225 the entries are associatively searched utilizing tag values to find the correct entry.

For example, a first P load operation may be received. From the P load value in field 206 it is determined that the P load is to load from cache 215. The P load references data block 216e in cache line 216. As a result, the predefined amount of data (e.g., blocks 216e-h), which each entry of LVB 225 is capable of holding, is loaded by load module 230 from cache line 216. Load module 230 provides data block 216e to the correct external location, such as an architectural register. Furthermore, data blocks 216e-h are provided to LVB 225 and stored in LVB entry 226.

Next, a load identified as a C load by a compiler is received. Here, the C load references data block 216f. Based on the C load value in field 206 it is determined that the load operation is to read from LVB 225. As a result, LVB 225 is searched by tag value and data block 216f is loaded from entry 226 by load module 230, which provides data block 216f to the correct data location. No access to cache 215 is necessarily made during performance of the C load.

In one embodiment, in response to portion 206 holding an F load value, a load from SB 220 is performed. SB 220 may be similar to existing SBs that track in-flight store operations. However, in contrast to previous methods where cache 215 and SB 220 would be searched in parallel, an F load may be directed to perform the load directly from SB 220 without accessing cache 215 in a similar manner to how a C load is loaded from buffer 225.

In one embodiment, in response to portion 206 holding a Q load value, the load is handled similar to P and C loads Like a P load, in case the value is not already inside LVB, a load to cache 215 and from cache 215 to LVB 225 is performed. Also, like a C load, a load from LVB 225 is performed. For example, the processor issues the Q load to LVB 225. If there is a hit in LVB 225 then the data is obtained from LVB 225. Otherwise, the load is re-issued to cache 215 and, like a P load, returns the data into LVB 225 for future uses.

In one embodiment, when hardware handles a C or F load either LVB 225 or SB 220 is accessed without accessing cache 215. As a result, if the data to be loaded is no longer held in buffers 225 or 220 then the load operation may be replayed as an N load.

Figure 3:
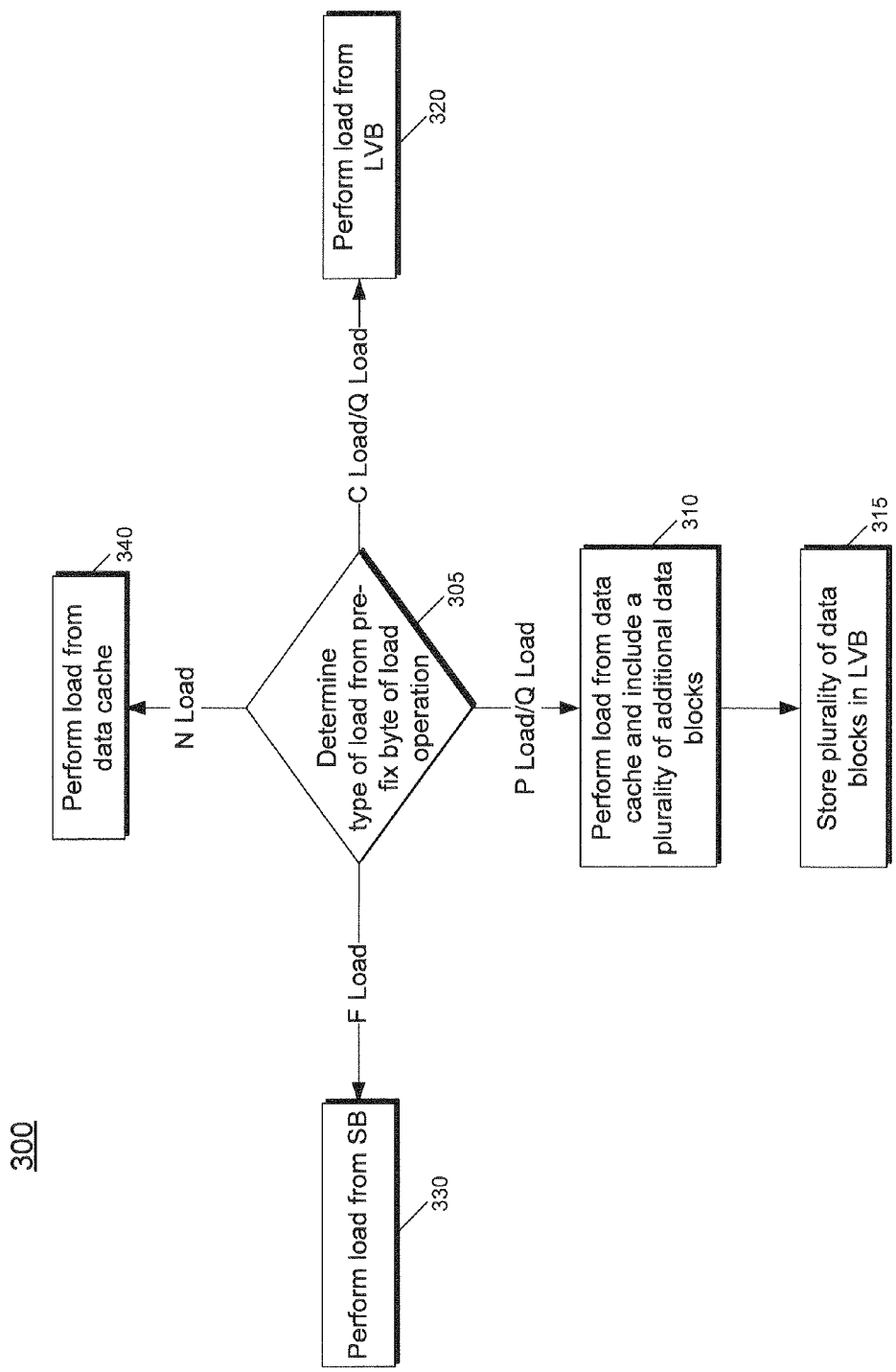
FIG. 3 illustrates a flow diagram for a method of efficiently handling load operations in an embodiment of the invention.

FIG. 3 depicts aspects of aforementioned embodiments in the context of a flow diagram for a method of efficient load handling. In block 305, a load type is determined from a pre-fix byte of a load operation.

In block 310, if the load is a P load a load from a data cache, including a plurality of data blocks in some embodiments of the invention, is performed. Here, at least one of the blocks is a block to be loaded in performing the P load, while another data block is a data block to possibly be loaded by a subsequent C load not yet encountered. A predefined number of physical data blocks may be loaded for a P load. The predefined number potentially corresponds to a size of entries in a LVB. In block 315, the data blocks are stored in an entry of a LVB. As a result, the physically contiguous blocks are now held in the LVB for access by subsequent consumer loads.

Returning to block 305, if the load is a C load then in block 320 the load is performed from the LVB. The LVB may be searched based on tag values and the correct entry of the LVB may be determined. As a result, the C load may be directly performed from the LVB without wasting power accessing a data cache.

If the load is an F load, in block 330 the load is performed from a SB. Similar to the above, the SB is searched and the appropriate value/data block is loaded. If an entry for a C or F load does not exist in the LVB or SB, the load is to be replayed as an N load (block 340) and the data cache is accessed. In one embodiment, the pre-fix byte associated with the operation in a trace cache or other storage logic is ignored by selection logic and a normal load is performed. In contrast, the pre-fix byte may be overwritten with a normal value. Therefore, whether through replay or through initial determination that the load is an N load, the load is performed normally in block 340 from a data cache.

If the load is a Q load, the processor determines whether the Q load may be serviced by the LVB. In block 320, if there is a hit in the LVB then the load is directed to the LVB. Otherwise, in block 310 the load is re-issued to the DCU and, like a P load in block 315, the data is directed to LVB for future use.

As can be seen from above, a system may efficiently identify P, C, F, Q, and/or N loads, as well as handle them maintaining high performance while conserving power. Complex and expensive hardware logic to identify producer and consumer loads dynamically may be avoided through use of code (e.g., compiler) to identify load types. Furthermore, compilers may be tweaked to various levels of aggressiveness to identify loads to ensure an accuracy level. As a result, selection logic is able to directly load from an appropriate memory structure, and in specific cases, is able to avoid data cache accesses.

A module or unit (e.g., units 130, 140, 150) as used herein refers to any hardware, software, firmware, or a combination thereof. Often boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

Embodiments of the invention may be described herein with reference to data such as instructions, functions, procedures, data structures, application programs, configuration settings, code, and the like. When the data is accessed by a machine, the machine may respond by performing tasks, defining abstract data types, establishing low-level hardware contexts, and/or performing other operations, as described in greater detail herein. The data may be stored in volatile and/or non-volatile data storage. For purposes of this disclosure, the terms "code" or "program" cover a broad range of components and constructs, including applications, drivers, processes, routines, methods, modules, and subprograms. Thus, the terms "code" or "program" may be used to refer to any collection of instructions which, when executed by a processing system, performs a desired operation or operations. In addition, alternative embodiments may include processes that use fewer than all of the disclosed operations, processes that use additional operations, processes that use the same operations in a different sequence, and processes in which the individual operations disclosed herein are combined, subdivided, or otherwise altered.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a processor, including first and second memories and a cache, to: (i) determine, via a compiler, whether a new load operation instruction is one of a producer (P) load, a consumer forwarded (F) load, an normal load (N), and a consumer reuse (C) load; (ii) direct the new load to the cache and store a value related to the new load in the first memory when the new load is determined to be a P load; (iii) direct the new load to the first memory and bypass the cache when the new load is determined to be a C load; (iv) direct the new load to the cache, and never to either of the first and second memories, when the new load is determined to be an N load; and (v) direct the new load to the second memory and bypass the cache when the new load is determined to be a F load;
wherein the new load includes an instruction to load data from, but not to, a memory.

2. The apparatus of claim 1, wherein the processor is to:
determine the new load is a hybrid (Q) load; and
initially direct the new load to the first memory bypassing the cache and subsequently to the cache when the new load is not satisfied by the first memory.

3. The apparatus of claim 1, wherein the processor is to determine whether the new load is a C load based on an identifier corresponding to the new load; the identifier having been previously determined based on determining another load was a P load.

4. The apparatus of claim 1, wherein the processor is to determine whether the new load is a C load based on an identifier corresponding to the new load; the identifier having been previously determined in response to emulations of the first memory which includes a load value buffer.

5. The apparatus of claim 1, wherein the processor is to determine whether the new load is a C load based on an identifier corresponding to the new load; the identifier having been previously determined in response to a Q load included in a code loop.

6. A method comprising:
determining, via a compiler, whether a new load operation instruction is one of a producer (P) load, a consumer forwarded (F) load, and a consumer reuse (C) load;
sending the new load to a cache, to load data from the cache, and storing a value related to the new load in a first memory when the new load is determined to be a P load;
sending the new load to the first memory, to load the data from the first memory, and bypassing the cache when the new load is determined to be a C load; and
sending the new load to a second memory, to load the data from the second memory, and bypassing the cache when the new load is determined to be a F load;
wherein (i) the new load includes an instruction to load the data but not store the data, and (ii) the F load loads the data when the data is to be written by an in-flight store operation.

7. The method of claim 6 comprising:
determining the new load is a hybrid (Q) load; and
initially sending the new load to the first memory bypassing the cache and subsequently to the cache when the new load is not satisfied by the first memory.

8. The method claim 6 comprising determining whether the new load is a C load based on an identifier corresponding to the new load; the identifier having been previously determined based on determining another load was a P load.

9. The method of claim 6 comprising determining whether the new load is a C load based on an identifier corresponding to the new load; the identifier having been previously determined in response to emulations of the first memory which includes a load value buffer.

10. The method of claim 6 comprising determining whether the new load is a C load based on an identifier corresponding to the new load; the identifier having been previously determined in response to a Q load included in a code loop.

11. At least one non-transitory storage medium having instructions stored thereon for causing a system to:
determine, via a compiler, whether a new load operation instruction is one of a producer (P) load, a consumer forwarded (F) load, and a consumer reuse (C) load;
direct the new load to a cache and store a value related to the new load in a first memory when the new load is determined to be a P load;
direct the new load to the first memory and bypass the cache when the new load is determined to be a C load; and
direct the new load to a second memory and bypass the cache when the new load is determined to be a F load, which loads data to be written by an in-flight store operation.

12. The at least one medium of claim 11 comprising instructions to:
determine the new load is a hybrid (Q) load; and
initially direct the new load to the first memory bypassing the cache and subsequently to the cache when the new load is not satisfied by the first memory.

13. The at least one medium of claim 11 comprising instructions to determine whether the new load is a C load based on an identifier corresponding to the new load; the identifier having been previously determined based on determining another load was a P load.

14. The at least one medium of claim 11 comprising instructions to determine whether the new load is a C load based on an identifier corresponding to the new load; the identifier having been previously determined in response to emulations of the first memory which includes a load value buffer.

15. The at least one medium of claim 11 comprising instructions to determine whether the new load is a C load based on an identifier corresponding to the new load; the identifier having been previously determined in response to a Q load included in a code loop.

* * * * *